(12) United States Patent
Simms et al.

(10) Patent No.: US 9,680,388 B2
(45) Date of Patent: Jun. 13, 2017

(54) SYSTEM AND METHOD FOR STARTING A VARIABLE FREQUENCY DRIVE WITH REDUCED ARC FLASH RISK

(71) Applicant: EATON CORPORATION, Cleveland, OH (US)

(72) Inventors: Stan Rex Simms, Arden, NC (US); Irving Albert Gibbs, Mills River, NC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/870,269

(22) Filed: Sep. 30, 2015

(65) Prior Publication Data
US 2017/0093298 A1    Mar. 30, 2017

(51) Int. Cl.
| | | |
|---|---|---|
| *H02M 7/515* | (2007.01) | |
| *H02M 5/42* | (2006.01) | |
| *H02M 1/32* | (2007.01) | |

(52) U.S. Cl.
CPC ............ *H02M 5/42* (2013.01); *H02M 1/32* (2013.01)

(58) Field of Classification Search
CPC ...................................................... H02M 5/42
USPC ............ 323/271–282, 315; 363/35, 125–127
See application file for complete search history.

(56) References Cited

U.S. PATENT DOCUMENTS

| | | | |
|---|---|---|---|
| 7,511,975 B2 * | 3/2009 | Hammond | H02H 9/001 323/908 |
| 7,880,343 B2 | 2/2011 | Kleinecke et al. | |
| 7,965,529 B2 * | 6/2011 | Gibbs | H02M 7/062 323/248 |
| 8,223,515 B2 | 7/2012 | Abolhassani et al. | |
| 2012/0032512 A1 | 2/2012 | Aiello et al. | |

OTHER PUBLICATIONS

Abdou Barrow, "Assembling and commissioning a WEG MV01 medium voltage VFD", EMA, Inc., http://www.emainc.net/newsletter/assembling-and-commissioning-a-weg-mv01-medium-v . . . ; pp. 1-3.

Siemens, "Applications and Advanced Features", NXG Control Manual, Chapter 5, pp. 5-1 through 5-120, A1A19001588: Vrsion 4.0.

(Continued)

*Primary Examiner* — Adolf Berhane
*Assistant Examiner* — Nusrat Quddus
(74) *Attorney, Agent, or Firm* — Eckert Seamans; Philip Levy

(57) ABSTRACT

In one embodiment, a variable frequency drive system includes a main contactor, a variable frequency drive, a charging module structured to generate a magnetizing AC voltage, wherein the charging module is structured to selectively provide the magnetizing AC voltage to a transformer of the variable frequency drive, and a sensing and control circuit having a number of sensors operably associated with the variable frequency drive. The sensing and control circuit is structured to detect a short circuit condition in the variable frequency drive when the magnetizing AC voltage is provided to the transformer based on an output of at least one of the number of sensors, and responsive thereto prevent the main contactor from being closed and thereby prevent the main AC voltage from being provided to the transformer.

15 Claims, 2 Drawing Sheets

(56) References Cited

OTHER PUBLICATIONS

Hitachi, Ltd., "HIVECTOL-HVI", Medium Voltage Muiti-level IGBT Drives, Jun. 2008, pp. 1-40, Printed in Japan (ICC).
Hitachi, Ltd., "HIVECTOL-HVI", Medium Voltage Multi-level IGBT Drives, Sep. 2012, pp. 1-16, Printed in Japan (ICC).
Siemens Industry, Inc., "Medium-Voltage Liquid-Cooled Drives", Robicon Perfect Harmony, www.siemens.com/automation, Catalog D 15.1—2012, USA Edition, pp. 1-92.
Hitachi HI-REL Power Electronics PVT. LTD., "Medium Voltage Drives", http://www.hitachi-hirel.com/products/drives-and-automation/medium-voltage drives, 1994, 2015, pp. 1-2.
AS/Robicon Industrial Power Control, "Welcome to the Next Generation of Power Controls", pp, 1-18.
Siemens AG, "The Drive of Choice for Highest Demands", Robicon Perfect Harmony, www.siemens.com/robicon-perfect-harmony, 2008, pp. 1-16, Printed in Germany.

* cited by examiner

SYSTEM AND METHOD FOR STARTING A VARIABLE FREQUENCY DRIVE WITH REDUCED ARC FLASH RISK

BACKGROUND

Field

The disclosed concept pertains generally to electrical systems that employ a variable frequency drive, and, more particularly, to a system and method for starting an variable frequency drive that reduces the risk of arc flash events occurring in the variable frequency drive.

Background Information

A voltage source inverter is often used to power a motor, such as an induction or synchronous motor, or a generator, with a suitable medium voltage. One example of a voltage source inverter is a variable frequency drive (VFD), which controls the rotational speed of an alternating current (AC) electric motor by controlling the frequency of the electrical power supplied to the motor. VFDs are also known as adjustable frequency drives (AFDs), variable speed drives (VSDs), AC drives, microdrives or inverter drives. Since the voltage is varied along with the frequency, these are sometimes also called VVVF (variable voltage variable frequency) drives.

Typically, a VFD first converts an AC input power to a DC intermediate power. The DC intermediate power is then converted to a quasi-sinusoidal AC power for driving the motor. Thus, the main components of a typical VFD include a number of input isolation transformers coupled to the source of AC power, a converter, such as a number of rectifier bridge assemblies, for converting the AC source power into the DC intermediate power, a direct current (DC) bus and associated DC bus capacitors for storing the DC intermediate power, and an inverter for converting the stored DC intermediate power into a variable voltage, variable frequency AC voltage for driving the motor.

VFDs are, under certain conditions, susceptible to internal arc faults. Such internal arc faults are a safety concern to human operators, and can cause significant damage to the components of the VFD.

SUMMARY

In one embodiment, a variable frequency drive system is provided that includes a main contactor, a variable frequency drive, a charging module structured to generate a magnetizing AC voltage, wherein the charging module is structured to selectively provide the magnetizing AC voltage to a transformer of the variable frequency drive, and a sensing and control circuit having a number of sensors operably associated with the variable frequency drive. The sensing and control circuit is structured to detect a short circuit condition in the variable frequency drive when the magnetizing AC voltage is provided to the transformer based on an output of at least one of the number of sensors, and responsive thereto prevent the main contactor from being closed and thereby prevent the main AC voltage from being provided to the transformer.

In another embodiment, a method of starting a variable frequency drive is provided, wherein the variable frequency drive includes a transformer structured to be selectively coupled to an AC source that provides a main AC voltage, the transformer having a number of sets of primary windings. The method includes generating a magnetizing AC voltage when the transformer is not coupled to the AC source, providing the magnetizing AC voltage to the transformer when the transformer is not coupled to the AC source to magnetize one or more of the number of sets of primary windings, and determining whether a short circuit condition exists in the variable frequency drive when the magnetizing AC voltage is being provided to the transformer and the main AC voltage is not being provided to the transformer. Responsive to determining that a short circuit condition does exist in the variable frequency drive, the method includes preventing the main AC voltage from being provided to the transformer, and responsive to determining that a short circuit condition does not exist in the variable frequency drive, the method includes providing the main AC voltage to the transformer and terminating the providing of the magnetizing AC voltage to the transformer.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
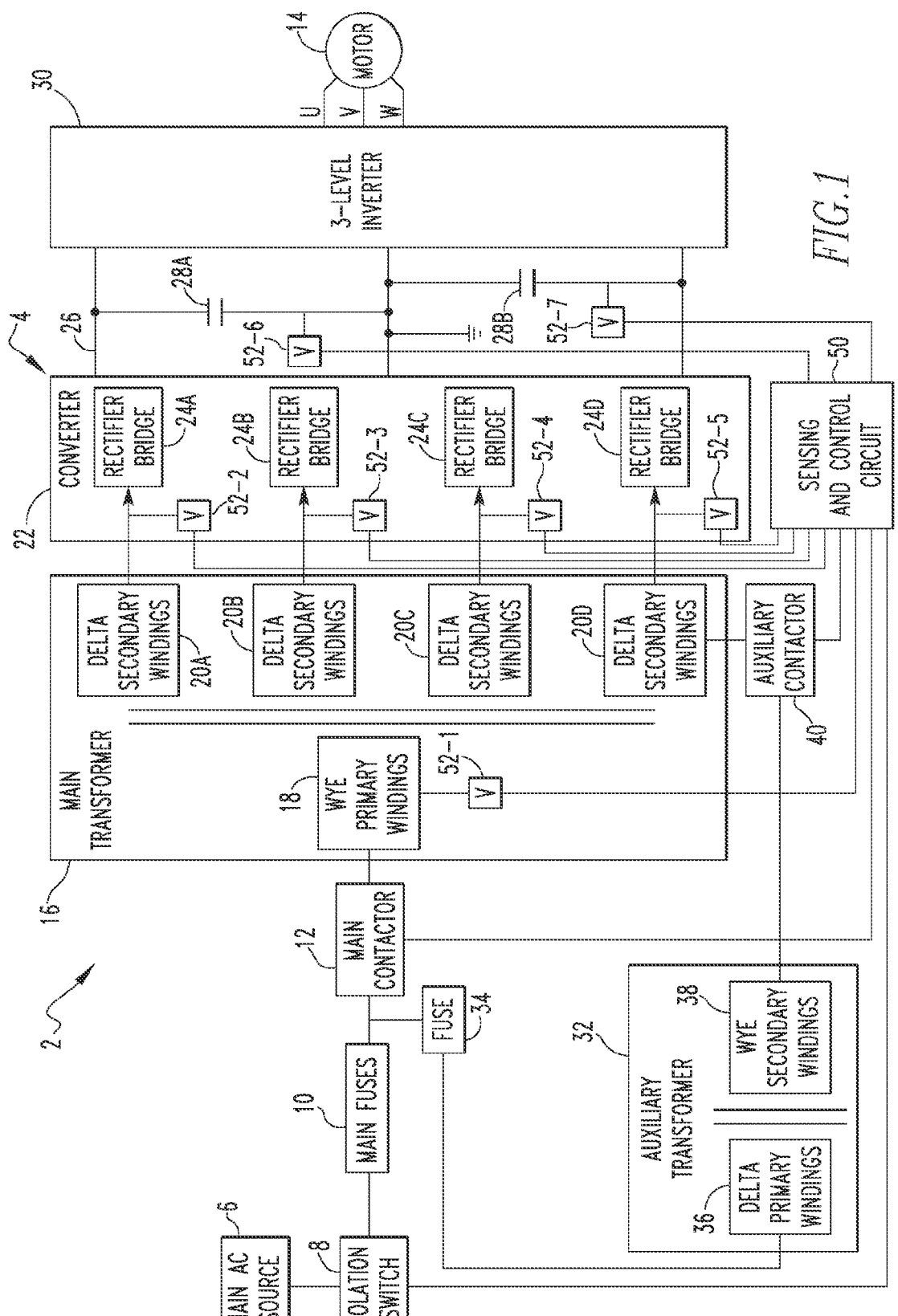
FIG. 1 is a schematic diagram of art electrical system according to one non-limiting exemplary embodiment which implements a method for staring a variable frequency drive according to the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As used herein, the term "set of windings" shall mean a group of one or more windings such as a group of one or more primary windings or a group of one or more secondary windings.

One problem encountered by VFDs is caused by the fact that, when a transformer is first energized, a transient current of up to 10 to 15 times larger than the rated transformer current can flow for several cycles. This transient current is known as inrush current. The magnitude of the inrush current may cause fuses to open, breakers or contactors to open, and protection relays to "false trip". For large drives, this problem is significant in that the power system must be sized to provide the transient in-rush currents. Eliminating the inrush is of significant advantage as it increases reliability and/or reduces system cost. A second problem encountered by voltage source inverters is charging the large capacitors during the initial energizing step to prevent damage to rectifiers, fuses and associated circuitry.

U.S. patent application Ser. No. 14/570,377, entitled "System and Method for Magnetizing a Transformer in an Electrical System Prior to Energizing the Electrical System" and owned by the assignee hereof, the disclosure of which is Incorporated herein by reference, provides a system and method for reducing and/or eliminating inrush current in an electrical system by implementing a "soft magnetization" starting sequence. The "soft magnetization" starting sequence includes charging or magnetizing an input transformer, such as, without limitation, an isolation transformer of a VFD, of the electrical system before the electrical system is energized by a main AC source (e.g., such as the main electrical grid). More specifically, that application provides a "soft magnetization" stalling sequence wherein a transformer is charged or magnetized in advance of the system being fully energized in such a manner that the flux and voltage of the primary winding or windings of the transformer are in phase with the main AC source that is soon to be applied to the transformer.

The concept disclosed herein is an enhancement to the system and method just described above that provides for effective monitoring of the "soft magnetization" process so as to avoid potential failures such as arc flashes in the VFD. In particular, as described in greater detail herein, the disclosed concept monitors the VFD for short circuit conditions at any of several locations within the VFD caused by, for example and without limitation, a tool left behind in the VFD, debris present in the VFD, or an animal present in the VFD. In the case of such short, circuit conditions, if the VFD were to be allowed to sequence to a fully operable state without first clearing the short-circuit condition, there would be a high likelihood of a failure event such as an arc flash occurring. Thus, according to the disclosed concept, when a short-circuit condition is detected, the VFD is prevented from sequencing to a fully operable state (until the short circuit is cleared) so as to minimize the likelihood of a failure such as an arc flash event.

FIG. 1 is a schematic diagram of an electrical system 2 according to one non-limiting exemplary embodiment which implements a method according to the disclosed concept for starting a VFD that reduces the risk of failures such as arc flash events occurring in the VFD. As seen in FIG. 1, system 2 includes a variable frequency drive 4 that is fed by a main AC source 6, such as the main electrical grid, through an isolation switch 8, main fuses 10, and a main contactor 12. In the non-limiting exemplary embodiment, main AC source 6 is a 4160V, poly-phase (e.g., three-phase) AC input. Also in the non-limiting exemplary embodiment, variable frequency drive 4 is used to drive a poly-phase motor 14.

Variable frequency drive 4 includes a 3-phase, phase shifting main transformer 16. In the non-limiting, exemplary embodiment, main transformer 16 is a wye-delta transformer having a set of wye-connected primary windings 18 and a number of sets of delta-connected secondary windings 20. In the non-limiting, exemplary embodiment, main transformer 16 is a 24-pulse transformer and includes four sets of delta-connected secondary windings 20, labeled 20A, 20B, 20C, and 20D. In the non-limiting, exemplary embodiment, each set of delta-connected secondary windings 20 comprises a set of extended delta windings, and the voltage at delta-connected secondary winding 20A is phase shifted +22.5°, the voltage at delta-connected secondary windings 20B is phase shifted −7.5°, the voltage at delta-connected secondary windings 20C is phase shifted +7.5°, and the voltage at delta-connected secondary windings 20D is phase shifted −22.5°. As seen in FIG. 1, a converter 22 is coupled to delta-connected secondary windings 20A-20D and receives the 3-phase AC output thereof. Converter 22 has four AC to DC rectifier bridges 24, labeled 24A, 24B, 24C and 24D, arranged in series connection creating two twelve pulse rectifiers which result in 24-pulse harmonic mitigation on the primary of main transformer 16. Converter 22 thus converts the 3-phase AC output present on delta-connected secondary windings 20A-20D to DC power.

The output of converter 22 is coupled to a DC link 26 (sometimes also referred to as a DC bus) having capacitors 28A and 28B. The output of DC link 26 is coupled to the input of an inverter 30. In the exemplary embodiment, inverter 30 is a 3-level inverter such as a 3-level NPC inverter, although it will be understood that other suitable inverter topologies may also be used. As is known in the art, inverter 30 converts the DC power on DC link 26 to 3-phase quasi-sinusoidal AC power (see phases U, V, W in FIG. 1) which is provided to poly-phase motor 14.

Electrical system 2 further includes a 3-phase, phase shifting auxiliary transformer 32 which, as described herein, is used to magnetize main transformer 16 of variable frequency drive 4 before variable frequency drive 4 is energized by main AC source 6 in order to reduce and/or eliminate the inrush current into variable frequency drive 4. The phase shifting of auxiliary transformer 32 is chosen so as to match the phase shifting of main transformer 16. Auxiliary transformer 32 is electrically connected between main fuses 10 and main contactor 12 through a fuse 34. Thus, auxiliary transformer 32 is structured to receive, on the primary thereof, the voltage from main AC source 6. In the non-limiting, exemplary embodiment, auxiliary transformer 32 is a delta-wye transformer having a set of delta-connected primary windings 36 and a set of wye-connected secondary windings 38. In the exemplary embodiment, auxiliary transformer 32 is a step down transformer that converts the voltage from main source 6 to a lower voltage. In the non-limiting exemplary embodiment, auxiliary transformer 32 is structured to output approximately 300V AC on the set of wye-connected windings 38 when a 4160V AC voltage is applied to delta-connected primary windings 36. It will be understood, however, that this is meant to be exemplary only and that other transformer ratios may also be employed within the scope of the disclosed concept.

As seen in FIG. 1, wye-connected secondary windings 38 are coupled to a first side of a 3-phase auxiliary contactor 40. In the non-limiting, exemplary embodiment, auxiliary contactor 40 is a low voltage contactor. The second side of auxiliary contactor 40 is coupled to one of the sets of delta-connected secondary windings 20 of main transformer 16. In the exemplary embodiment, the second side of auxiliary contactor 40 is coupled to the set of delta-connected secondary windings 20D, although it will be understood that this is exemplary only and that the connection just described may be made to any of the other sets of delta-connected secondary windings 20, or even to the set of wye-connected primary windings 18.

Figure 2:
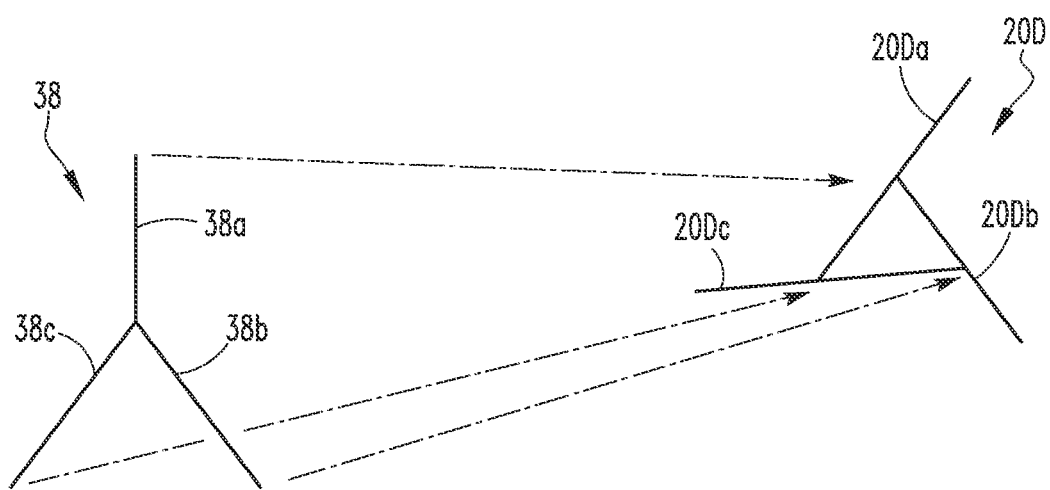
FIG. 2 is a schematic representation illustrating how the windings of an auxiliary transformer of the electrical system may be connected to the windings of a main input transformer of the electrical system of FIG. 1 according to an exemplary embodiment of the disclosed concept.

FIG. 2 is a schematic representation illustrating how the connection of the set of wye-connected secondary windings 38 is connected to the set of delta-connected secondary windings 20D through auxiliary contactor 40 according to an exemplary embodiment. The set of wye-connected secondary windings 38 includes windings 38a, 38b, and 38c, and the delta-connected secondary windings 20D includes extended windings 20Da, 20Db and 20Dc. As seen in FIG. 2, winding 38a is connected at the junction of winding 20Da and 20Db, winding 38b is connected at the junction of winding 20Dc and 20Db, and winding 38C is connected to the junction of winding 20Dc and 20Da. Again, it will be appreciated that the particular configurations described herein are exemplary only, and that other connection configurations are possible within the scope of the disclosed concept. For example, and without limitation, main transformer 16 may be a transformer other than a wye-delta transformer and auxiliary transformer 32 may be a transformer other than a delta-wye transformer.

Referring again to FIG. 1, system 2 further includes a sensing and control circuit 50. Sensing and control circuit 50 is operatively coupled to main contactor 12, and is structured to control operation of main contactor 12 in accordance with the disclosed concept as described elsewhere herein. In the exemplary embodiment, sensing and control circuit 50 comprises one or more integrated circuit components and includes analog-to-digital conversion circuitry and a control unit. The control unit includes a processor, such as, without limitation, a microprocessor or a microcontroller, and a suitable memory component for storing one or more software routines executable by the processor for implementing the disclosed concept as described herein. Furthermore, system 2 includes a plurality of voltage sensors 52 structured to measure the voltage at various particular locations throughout variable frequency drive 4. Each of the voltage sensors may be, for example, and without limitation, a galvanic isolated voltage transducer, such as the LEM CV4-6000 series voltage transducer. As seen in FIG. 2, the output of each of the voltage sensors 52 is provided to sensing and control circuit 50 so that the measurements made by voltage sensors 52 can be utilized by sensing and control circuit 52 detect short, circuit conditions at the associated locations according to the disclosed concept as described herein.

In the non-limiting illustrated embodiment, voltage sensors 52 include a number of first voltage sensors 52-1 associated with main transformer 16 that are operatively coupled to and structured to measure the AC voltage of WYE primary windings 18. Also in the non-limiting illustrated embodiment, voltage sensors 52 include a number of second voltage sensors 52-2, a number of third voltage sensors 52-3, a number of fourth voltage sensors 52-4, and a number of third voltage sensors 52-5 each associated with converter 22. The number of second voltage sensors 52-2 are operatively coupled to the input of rectifier bridge 24A and are structured to measure the AC voltage at the input of rectifier bridge 24A. Similarly, the number of third voltage sensors 52-3 are operatively coupled to the input of rectifier bridge 24B and are structured to measure the AC voltage at the input of rectifier bridge 24B, the number of fourth voltage sensors 52-4 are operatively coupled to the input of rectifier bridge 24C and are structured to measure the AC voltage at the input of rectifier bridge 24C, and the number of fifth voltage sensors 52-5 are operatively coupled to the input of rectifier bridge 24D and are structured to measure the AC voltage at the input of rectifier bridge 24D. Finally, the voltage sensors 52 include a number of sixth voltage sensors 52-6 and a number of seventh voltage sensors 52-7, each associated with DC link 26. As seen in FIG. 1, the number of sixth voltage sensors 52-6 are operatively coupled to a terminal of capacitor 28A to measure the DC voltage of capacitor 28A, and the number of seventh voltage sensors 52-7 are operatively coupled to a terminal of capacitor 28B to measure the DC voltage of capacitor 28B. It will be appreciated that the embodiment shown in FIG. 1 is meant to be exemplary only, and that the disclosed concept may be implemented with more or less voltage sensors 52 than as shown in FIG. 1. For example, in one particular exemplary embodiment, voltage sensors 52 include only a sixth voltage sensor 52-6 and a seventh voltage sensors 52-7 as shown (with the remaining voltage sensors 52 being omitted). Another exemplary embodiment, the just described omitted voltage sensors 52 are optional, and may be included as dictated by the particular application.

In operation, when variable frequency drive 4 is to be "turned on", main contactor 12 is moved (under control of sensing and control circuit 50) to an open position and auxiliary contactor 40 (under control of sensing control circuit 50) is moved to a closed position. Isolation switch 8 may then be closed (under control of sensing control circuit 50), which causes the voltage of main AC source 6 to be applied to the set of delta-connected primary windings 36 of auxiliary transformer 32. This will result in a voltage being induced in the set of wye-connected secondary windings 38 of auxiliary transformer 32. That voltage will be applied to the set of delta-connected secondary windings 20D of main transformer 16 through auxiliary contactor 40 in order to magnetize main transformer 16. Because of the relatively high impedance of auxiliary transformer 32, main transformer 16 will be magnetized softly at less than the rated current.

At this point, and as an enhancement of the methodology of U.S. patent application Ser. No. 14/570,377, sensing and control circuit 50 obtains the voltage measurements being made by each of the voltage sensors 52 (i.e., 52-1, 52-2, 52-3, 52-4, 52-5 and 52-6), and based thereon makes a determination as to whether a short circuit condition exists at any one of the several monitored locations within variable frequency drive 4 (each monitored location being associated with a respective one of the voltage sensors 52). In the exemplary embodiment, this short circuit condition detection is performed by determining whether the measured voltage exceeds a predetermined threshold condition within a predetermined critical amount of time. If the measured voltage does not exceed the predetermined threshold condition within the predetermined critical amount of time, a short circuit condition will be deemed to have been detected. In any such situation where a short circuit condition is detected, sensing and control circuit 50 will operate so as to not permit main contactor 12 to be closed until such time that the short circuit condition is eliminated. Doing so will prevent closure of main contactor 12 and thus prevent full energizing of variable frequency drive 4 in situations where a short circuit condition exists, which is advantageous as such conditions are more likely to lead to a failure such as an arc flash event. In addition, in the case of a short circuit, the incident energy would be drastically reduced as a result of the impedance provided by fuse 34 and auxiliary transformer 32.

If no short circuit condition is detected, or if a detected short, circuit condition has been remedied, sensing and control circuit 50 then determines whether main transformer 16 is sufficiently magnetized. Once main transformer 16 is sufficiently magnetized, main contactor 12 is closed such that the voltage of main AC source 6 will be applied to the already magnetized set of wye-connected primary windings 18 of main contactor 16 to fully energize variable frequency drive 4. After main contactor 12 is closed, auxiliary contactor 40 is opened. When main contactor 12 is closed, the phase of the set of wye-connected primary windings 18 will match the phase of the voltage of main AC source 6 being applied. Because the wye-connected primary windings 18 have already been magnetized as just described, the inrush current into variable frequency drive 4 will be reduced and/or eliminated. When auxiliary contactor 40 is closed, DC link 26 (the DC bus) is charged.

The determination as to when the main transformer 16 is sufficiently magnetized such that full energizing of variable frequency drive 4 may begin may be made in any of a number of ways, including monitoring the voltage of the DC link 26 and determining that sufficient magnetization has occurred when that voltage reaches a certain threshold level, monitoring the voltage of the set of wye-connected primary windings 18 and determining that sufficient magnetization has occurred when that voltage reaches a certain threshold level, or measuring the current flowing into auxiliary transformer 32 and determining that sufficient magnetization has occurred when that current settles, meaning that it is no longer changing to a significant degree. As noted elsewhere herein, if a short circuit condition exists, auxiliary transformer 32 helps to reduce the incident energy by its internal impedance (as compared to a fully energized power stage, which has a much lower impedance path).

Thus, the disclosed concept provides a mechanism and methodology by which a transformer of a VFD, such as main transformer 16, may be magnetized in advance of being fully energized in a manner that eliminates and/or reduces the inrush current into the transformer, and in a manner wherein such "soft magnetization" is monitored in order to avoid potential failure events such as arc flash events. A secondary benefit of the mechanism and methodology of the disclosed concept is that DC link 26 will also be charged, thus eliminating the need for a pre-charge circuit. Furthermore, by adding additional windings to auxiliary transformer 32, it may be used for other purposes, such as providing power for a cooling fan for variable frequency drive 4. Still other potential benefits include reduced arc flash incident energy levels because protection relays can be set with lower instantaneous current trip settings. This feature provides quicker fault clearing time and lower arc flash ratings for the equipment and personnel protective equipment.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A variable frequency drive system, comprising:
   a main contactor;
   a variable frequency drive including:
      a transformer selectively connectable to an AC source that provides a main AC voltage through the main contactor, the transformer having a number of sets of primary windings and a number of sets of secondary windings;
      a converter coupled to the number of sets of secondary windings;
      a DC link coupled to an output of the converter; and
      an inverter coupled to the DC link;
   a charging module structured to generate a magnetizing AC voltage, wherein the charging module is structured to selectively provide the magnetizing AC voltage to the transformer, wherein the charging module is structured to be selectively coupled to the AC source and generate the magnetizing AC voltage in response to receiving the main AC voltage; and
   a sensing and control circuit having a number of sensors operably associated with at least one of the transformer, the converter, and the DC link, the sensing and control circuit being structured to detect a short circuit condition in the variable frequency drive when the magnetizing AC voltage is provided to the transformer based on an output of at least one of the number of sensors, and responsive thereto prevent the main contactor from being closed and thereby prevent the main AC voltage from being provided to the transformer.

2. The variable frequency drive according to claim 1, wherein the magnetizing AC voltage is such that responsive to the magnetizing AC voltage being provided to the transformer, one or more of the number of sets of primary windings will be magnetized in a manner wherein a flux of the one or more of the number of primary windings is in phase with the main AC voltage provided from the AC source.

3. The variable frequency drive according to claim 1, wherein each of the number of sensors is a voltage sensor.

4. A variable frequency drive system, comprising:
   a main contactor;
   a variable frequency drive including;
      a transformer selectively connectable to an AC source that provides a main AC voltage through the main contactor, the transformer having a number of sets of primary windings and a number of sets of secondary windings;
      a converter coupled to the number of sets of secondary windings:
      a DC link coupled to an output of the converter; and
      an inverter coupled to the DC link:
   a charging module structured to generate a magnetizing AC voltage, wherein the charging module is structured to selectively provide the magnetizing AC voltage to the transformer; and
   a sensing and control circuit having a number of sensors operably associated with at least one of the transformer, the converter, and the DC link, the sensing and control circuit being structured to detect a short circuit condition in the variable frequency drive when the magnetizing AC voltage is provided to the transformer based on an output of at least one of the number of sensors, and responsive thereto prevent the main contactor from being closed and thereby prevent the main AC voltage from being provided to the transformer, wherein each of the number of sensors is a voltage sensor, and wherein the number of sensors includes a number of first voltage sensors coupled to a terminal of one or more capacitors of the DC link.

5. The variable frequency drive according to claim 3, wherein the number of sensors includes a number of first voltage sensors coupled to the number of sets of primary windings, a number of second voltage sensors coupled to an input of one or more rectifier bridges of the converter, and a number of third voltage sensors coupled to a terminal of one or more capacitors of the DC link.

6. The variable frequency drive system according to claim 4, wherein the charging module is structured to be selectively coupled to the AC source and generate the magnetizing AC voltage in response to receiving the main AC voltage.

7. The variable frequency drive system according to claim 1, wherein the charging module comprises an auxiliary transformer having a number of sets of auxiliary primary windings and a number of sets of auxiliary secondary windings, wherein one of the number of sets of auxiliary secondary windings is structured to be selectively coupled to the transformer.

8. The variable frequency drive system according to claim 7, wherein the one of the number of sets of auxiliary secondary windings is structured to be selectively coupled to one of the transformer through an auxiliary contactor.

9. The variable frequency drive system according to claim 8, wherein the variable frequency drive system includes a main power stage path including the main contactor, the transformer, the converter, and the DC link, the main power stage path having a first impedance, and wherein the variable frequency drive system includes an auxiliary stage path including a fuse, the auxiliary transformer, and the auxiliary contactor, the auxiliary stage path having a second impedance, wherein responsive to the short circuit condition the second impedance is greater than the first impedance.

10. A method of starting a variable frequency drive, the variable frequency drive including a transformer structured to be selectively coupled to an AC source that provides a main AC voltage, the transformer having a number of sets of primary windings, the method comprising:

generating a magnetizing AC voltage when the transformer is not coupled to the AC source;

providing the magnetizing AC voltage to the transformer when the transformer is not coupled to the AC source to magnetize one or more of the number of sets of primary windings;

determining whether a short circuit condition exists in the variable frequency drive when the magnetizing AC voltage is being provided to the transformer and the main AC voltage is not being provided to the transformer;

responsive to determining that a short circuit condition does exist in the variable frequency drive, preventing the main AC voltage from being provided to the transformer; and responsive to determining that a short circuit condition does not exist in the variable frequency drive, providing the main AC voltage to the transformer and terminating the providing of the magnetizing AC voltage to the transformer, wherein the generating the magnetizing AC voltage comprises providing the main voltage to a set of primary windings of an auxiliary transformer, and wherein the providing the magnetizing AC voltage comprises coupling a set of secondary windings of the auxiliary transformer to the transformer when the transformer is not coupled to the AC source.

11. The method according to claim 10, wherein the providing the magnetizing AC voltage to the transformer when the transformer is not coupled to the AC source to magnetize one or more of the number of sets of primary windings is in a manner wherein a flux of the one or more of the number of primary windings is in phase with the main AC voltage.

12. The method according to claim 10, wherein the terminating the providing of the magnetizing AC voltage is performed before or after the providing of the main AC voltage to the transformer.

13. A method of starting a variable frequency drive, the variable frequency drive including a transformer structured to be selectively coupled to an AC source that provides a main AC voltage, the transformer having a number of sets of primary windings, the method comprising:

generating a magnetizing AC voltage when the transformer is not coupled to the AC source, providing the magnetizing AC voltage to the transformer when the transformer is not coupled to the AC source to magnetize one or more of the number of sets of primary windings;

sensing a number of voltages associated with at least one of the transformer, a converter of the variable frequency drive, and a DC link of the variable frequency drive;

determining whether a short circuit condition exists in the variable frequency drive when the magnetizing AC voltage is being provided to the transformer and the main AC voltage is not being provided to the transformer, wherein the determining whether a short circuit condition exists in the variable frequency drive is based on at least one of the number of voltages; responsive to determining that a short circuit condition does exist in the variable frequency drive, preventing the main AC voltage from being provided to the transformer; and responsive to determining that a short circuit condition does not exist in the variable frequency drive, providing the main AC voltage to the transformer and terminating the providing of the magnetizing AC voltage to the transformer.

14. The method according to claim 13, wherein the number of voltages comprises a number of first voltages measured at the a terminal of one or more capacitors of the DC link.

15. The method according to claim 13, wherein the number of voltages comprises a number of first voltages measured at the number of sets of primary windings, a number of second voltages measured at an input of one or more rectifier bridges of the converter, and a number of third voltages measured at a terminal of one or more capacitors of the DC link.

* * * * *